May 6, 1969

E. A. MORRISON 3,443,114

MULTICIRCUIT CONTROL SYSTEM

Filed Feb. 17, 1966

Inventor:
Edwin A. Morrison
By Wilson & Deppert
Attorneys

United States Patent Office 3,443,114
Patented May 6, 1969

3,443,114
MULTI-CIRCUIT CONTROL SYSTEM
Edwin A. Morrison, Highland Park, Ill., assignor to Culligan, Inc., Northbrook, Ill., a corporation of Delaware
Filed Feb. 17, 1966, Ser. No. 528,225
Int. Cl. H02j 3/14
U.S. Cl. 307—41   10 Claims

ABSTRACT OF THE DISCLOSURE

A multi-circuit control system for actuating two or more pieces of equipment, such as water softeners, so that only one piece of equipment is actuated at any one time, and the pieces of equipment may be actuated in sequence. The control system utilizes a pair of substantially identical circuits, each having a pulsing or signalling source, which actuates a relay, a switch actuated by the relay to energize a holding circuit, a lockout relay, the piece of equipment for that circuit, and a motor rotating a cam means. The cam means actuates a microswitch which operates a holding circuit. The lockout relay operates an interlock in the other circuit so that signal for the other circuit will not actuate the equipment controlled by the other circuit until the first circuit has completed its cycle.

---

The present invention relates to a programming circuit and more particularly to a circuit which will prevent concurrent operation of two or more pieces of equipment.

Among the objects of the present invention is the provision of a program circuit which will prevent concurrent operation of two or more pieces of equipment such as duplex water softeners. The program circuit provides two or more substantially identical circuits which may be arranged in either parallel or series with each circuit controlling a piece of equipment. Each circuit includes a function-memory relay that is energized by a random pulse and establishes a holding circuit to retain the relay in energized position during the desired operation although the pulse is only momentary. Also, if the circuit cannot be energized, a signal is stored by the relay until the circuit is completed allowing energization.

Another object of the present invention is the provision of a program circuit where each circuit therein includes a lockout relay. When one circuit is energized, the lockout relay prevents energization of the other circuits until the circuit initially energized has completed its cycle or program.

Another object of the present invention is the provision of a program circuit where each circuit includes a motorcam-microswitch which establishes the time interval for actuation of the piece of equipment controlled by that circuit.

The present invention further comprehends the provision of a program circuit having circuits wired in series to allow actuation of equipment in a predetermined sequence. Here again, the circuits function so that only one piece of equipment may be operated at any one time.

Further objects are to provide an arrangement of maximum simplicity, efficiency, economy and ease of assembly and operation, and such further objects, advantages and capabilities as will later more fully appear and are inherently possessed thereby.

Figure 1:
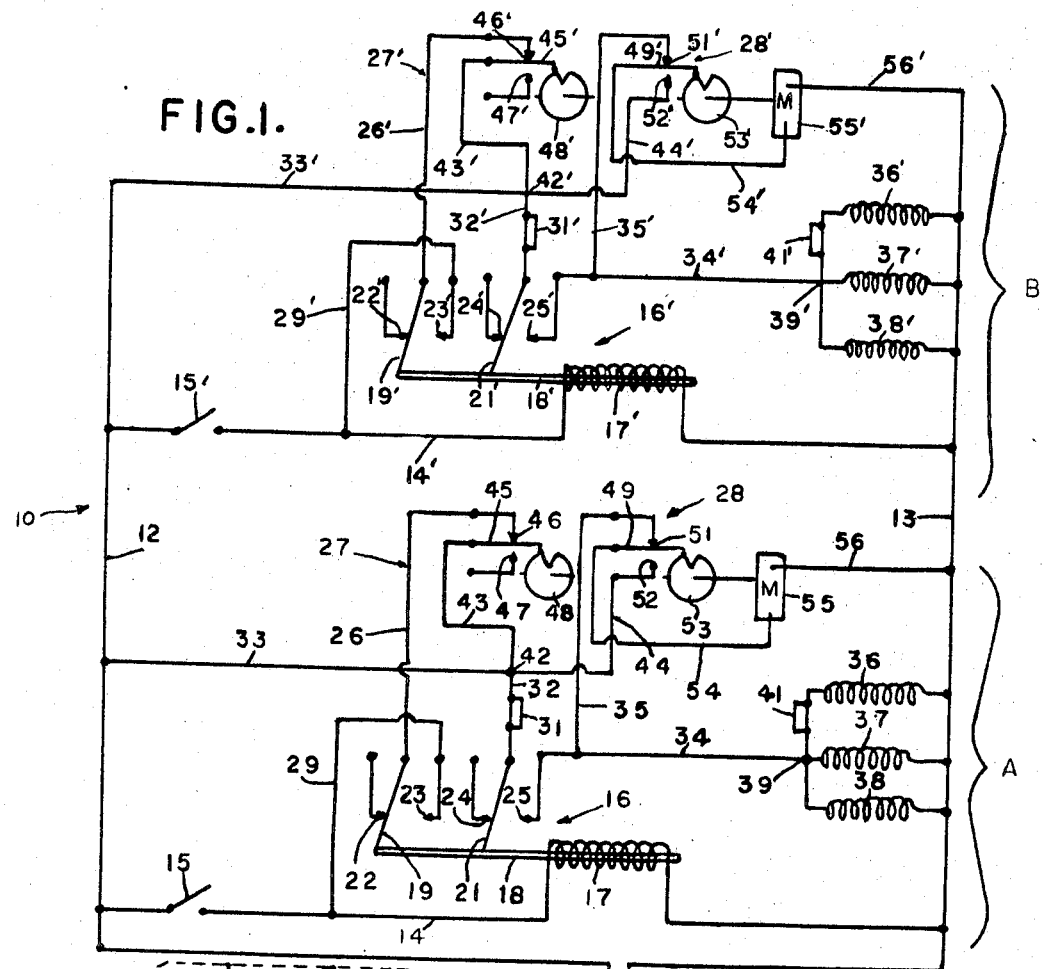
Figure 2:
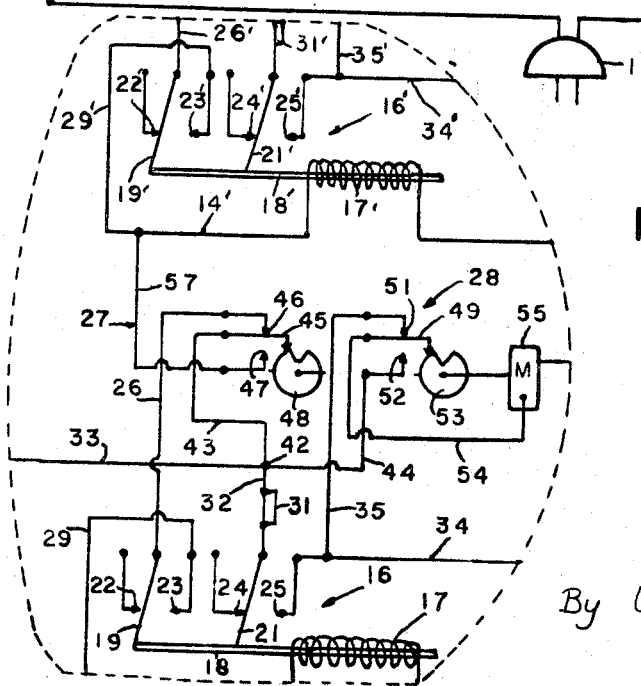

In the drawing:
FIGURE 1 is a diagrammatic showing of a program circuit utilizing two circuits arranged in parallel relation.
FIG. 2 is a partial view of the circuits of FIG. 1 showing a modification to provide a series arrangement.
Referring more particularly to the disclosure in the drawing wherein are shown illustrative embodiments of the program circuit of the present invention, FIG. 1 discloses a program circuit 10 having two circuits A and B arranged in parallel and connected at 11 to a source of alternating current, and leading from the source 11 are a pair of conductors or lines 12 and 13. In circuit A, line 14 extends between lines 12 and 13 and includes a switch or other means or phenomena 15 which can be converted into an electrical pulse. Also included in the line is a coil 17 of a relay 16.

The relay 16 is a double-pole double-throw switch having an arm 18 connected by parallel conductive members 19, 21 to contacts 22, 23, 24 and 25 of the relay 16. The inactive contacts 22 and 24 are not connected into any circuit but only provide an inactive position for the relay 16 as shown. A line 26 from conductive member 19 leads to a single-pole double-throw switch 27 to be later described. A line 29 extends from the line 14 between switch 15 and coil 17 to the contact 23. The conductive member 21 is connected to one pole of an interlock 31 from circuit B; a line 32 from the interlock extending to a junction 42. The line 33 extends between line 12 and junction 42.

The contact 25 has a line 34 leading to a parallel arrangement of the equipment controlled, such as a timer 36 and time delay switch 37, and relay 38; all three members extending between the junction 39 and the line 13. A timer interlock 41 controlled by the time delay switch 37 is located between the junction 39 and the timer 36. A line 35 leads from the line 34 to a second single-pole double-throw switch 28 in the microswitch. Also a line 43 leads from the junction 42 to the switch 27, and a line 44 leads from the junction 42 to the switch 28.

The switch 27 is a single-pole double-throw switch and has a conductive arm 45 and a pair of contacts 46 and 47; contact 47 being inactive. The switch arm has a follower riding on a rotary cam 48 rotated by a motor 55. The line 26 from member 19 extends to contact 46. The switch 28 has a conductive arm 49 and a pair of contacts 51 and 52. The arm 49 has a follower riding on cam 53 also rotated by motor 55. The line 35 extends to contact 51 and the line 44 extends to contact 52, while a line 54 extends from conductive arm 49 to the motor 55 and a line 56 extends from the motor to line 13.

Referring to circuit B connected in parallel with circuit A across lines 12 and 13, this circuit is identical with circuit A and the same reference numerals having a prime are associated with the identical parts to circuit A. The function of relay 38 is to interrupt the signal in every other circuit, there being one circuit for each piece of equipment being controlled. The interlock 31' in circuit B performs this function by opening when relay 38 is energized. The interlock 31' is electrically connected to the relay 38 and the interlock 31 is electrically connected to the relay 38'. Relay 38 would have such an interlock in every other circuit. The relays 38, 38' perform the important function of isolating the actuating signal to the piece of equipment in opposite circuits. This allows relays 16, 16' to function as memory relays and store an electrical pulse from 15, 15', as the case may be.

Considering the operation of the programming circuit 10, with the switches 27, 27', 28 and 28' in the positions shown and where circuits A and B are connected to two separate pieces of equipment, an electrical pulse in circuit A, such as the momentary closing of switch 15, energizes the coil 17 of relay 16 drawing the core to the right so that arms 19 and 21 engage the poles of contacts 23 and 25, respectively. A holding circuit retaining the coil 17 energized is established from line 12 through line 33, junction 42, line 43, arm 45, contact 46, line 26, arm 19, contact 23, and line 29 to line 14 so that if the switch 15 is opened, the circuit A would not be interrupted until the operation has been completed. Also, the circuit through arm 21 and contact 25 is closed to energize the piece of equipment and the relay 38 through lines 33 and 32, interlock 31, arm 21, contact 25, and line 34 to junction 39; the equipment in this instance being the timer 36.

Energization of the relay 38 interrupts circuit B by opening the interlock 31'. Also, a circuit is completed to energize the motor 55 through lines 33 and 32, interlock 31, arm 21, contact 25, lines 34 and 35, contact 51, arm 49 and lines 54 and 56. The motor 55 rotates the cams 48 and 53 simultaneously until the switch followers drop in the aligned recesses in cams 48 and 53 to open contacts 46 and 51 and close contacts 47 and 52 by arms 45 and 49, respectively.

Opening contact 46 deenergizes the holding circuit for coil 17 so that the switch of relay 16 returns to the position of FIG. 1 to terminate energization of the equipment (timer 36). Also, opening contact 51 interrupts the circuit energizing the motor 55, but the closing of contact 52 continues operation of the motor 55 until the followers are lifted out of the cam recessed to open contacts 47 and 52 and circuit A is returned to its original condition. The speed of the motor 55 determines the time interval of operation of circuit A. With respect to the equipment energized, namely, the timer 36, when the timer is energized, the time delay switch 37 is also energized, and this switch controls the interlock 41 to interrupt power to the timer 36 after a suitable time delay period; the timer delay switch and interlock operating substantially independently of the time period of the motor 55.

Should the switch 15' pulse during operation of circuit A, the relay 16' stores that signal until circuit A has completed its program, dropping out relay 38 and closing interlock 31' in circuit B which then allows the signal to actuate the equipment controlled by circuit B. The signal is stored by energizing the coil 17' to throw the switch arm 18' and establish the holding circuit for the coil through line 33', junction 42', line 43', arm 45', contact 46', line 26', arm 19, contact 23' and line 29 to line 14. However, the equipment 36', relay 38' and motor 55' cannot be energized because the interlock 31' is open.

When relay 38 in circuit A is deenergized to close the interlock 31', the circuit is completed to the relay 38', equipment 36' and motor 55' and operation proceeds over the predetermined time interval as described above for circuit A. Energizing relay 38' opens interlock 31 in circuit A so that this circuit cannot be operated until the program for circuit B is completed.

In FIG. 2, a modification of the circuit of FIG. 1 is shown to connect or wire the circuits A and B in series and provide the actuation of the equipment in a predetermined sequence. The modification shown in FIG. 2 provides a line 57 extending between the contact 47 of switch 27 and the line 14' between the junction of line 29' and line 14' and the coil 17'. Also, the switch 15' and that portion of line 14' between line 12 and the junction of lines 14' and 29' is eliminated.

Now referring to FIG. 1 as modified by FIG. 2, a cycle of operation is initiated by an impulse of switch 15 to energize coil 17 of relay 16 and thus move the core 18 of the switch to establish the holding circuit for coil 17 and energize the motor 55, relay 38 and the equipment, such as timer 36, as above described. The cams 48 and 53 are rotated by the motor 55 and, when the aligned recesses of the cams are reached, the switches 27 and 28 are actuated from the position shown in FIG. 1 to open contacts 46 and 51 and close contacts 47 and 52. Opening contact 46 returns the switch of relay 16 to its original position, and opening of contact 51 opens the circuit to the motor 55 while closing contact 52 continues operation of the motor until the followers for arms 45 and 49 are lifted out of the recesses of cams 48 and 53.

The closing of contact 47 by arm 45 establishes a circuit from line 12 through line 33, junction 42, line 43, arm 45, contact 47 and line 57 to line 14' to energize coil 17' of relay 16' to shift the core 18' and establish the holding circuit from line 12 through line 33' to retain the coil 17' energized. As opening of contact 46 deenergizes relay 38, the interlock 31' is closed causing energization of motor 55' and the equipment connected in circuit B. When the followers are lifted out of the recesses in cams 48 and 53, contacts 47 and 52 are opened but the holding circuit in circuit B retains the relay 16' in energized position and energization of relay 38' opens interlock 31 in circuit A. Thus, the modification of FIG. 2 provides a sequential operation of circuits A and B.

Although only the two circuits A and B are shown in parallel in FIG. 1 and in series in FIG. 2, it is obvious that additional substantially identical circuits could be added with each circuit controlling equipment so that operation of each piece of equipment is separate from the others. The only change required for each additional circuit would be an additional interlock in each circuit energized by each relay 38, 38', etc. Thus, if three circuits were involved, circuit A would have interlock 31 actuated by relay 38' in circuit B and an interlock for the relay corresponding to relay 38 of circuit A in the third circuit in the line 32 between junction 42 and arm 21. For three circuits, each circuit would have two separate interlocks; for four circuits, each circuit would have three separate interlocks; etc. Furthermore, it is not my desire to unnecessarily limit the scope or the utility of the improved features by virtue of these illustrative embodiments showing two circuits.

Having thus disclosed my invention.

I claim:

1. A program circuit comprising multiple substantially identical circuits connected to a power source, at least one circuit having a pulsing means to actuate the circuit, each circuit having a relay, a switch actuated by the relay, a holding circuit by said switch to retain the relay energized, a lockout relay actuated by said switch, an interlock in each other circuit actuated by said lockout relay, equipment to be programmed by said circuit actuated by said switch, and means determining the interval of actuation of said equipment actuated by said switch including a microswitch, cam means actuating the microswitch, and a motor actuated by said first mentioned switch to rotate said cam means.

2. A program circuit as set forth in claim 1, in which said first mentioned switch is a double-pole double-throw switch.

3. A program circuit as set forth in claim 2, in which said microswitch includes a pair of single-pole double-throw switches having a cam follower actuating each switch, said cam means including a pair of cams each having a recess to open one of the switches, and a holding circuit actuated by the opening of one switch to operate the motor until each cam follower has been lifted out of the recess of its associated cam.

4. A program circuit as set forth in claim 3, in which said first switch of the microswitch includes a pair of lines to said double-pole double-throw switch, and said second switch of the microswitch is connected to and controls operation of said motor.

5. A program circuit as set forth in claim 2, in which the interlock in the circuit actuated by the lockout relay of another circuit is positioned between the first mentioned double-pole double-throw switch and the microswitch and, when open, interrupts the circuit to the equipment to be actuated.

6. A program circuit as set forth in claim 2, in which when a pulse actuating the first mentioned relay to throw the double-pole double-throw switch occurs during operation of a second circuit, the holding circuit continues actuation of the first mentioned relay as a memory relay until energization of the second circuit is discontinued and the interlock in the first circuit is closed causing actuation thereof.

7. A program circuit as set forth in claim 1, in which the equipment to be actuated and the lockout relay in each circuit are connected in parallel.

8. A program circuit as set forth in claim 1, in which the multiple substantially identical circuits are wired in parallel with a pulsing means in each circuit.

9. A program circuit as set forth in claim 4, in which an open contact of said first switch of the microswitch in the first circuit is connected to the first mentioned relay in the second circuit to connect the circuits in series, and a pulsing means is only found in the first circuit.

10. A program circuit as set forth in claim 9, in which said circuits are actuated sequentially with the opening of the one switch of the microswitch in the first circuit by the cam closing the contact to the relay in the second circuit to energize the relay and its associated holding circuit.

References Cited

UNITED STATES PATENTS 2,366,197   1/1945   Klemperer _____ 307—41

ROBERT K. SCHAEFER, *Primary Examiner.*

H. J. HOHAUSER, *Assistant Examiner.*

U.S. Cl. X.R.

318—101